United States Patent [19]

Norman, Jr. et al.

[11] Patent Number: 5,807,457
[45] Date of Patent: Sep. 15, 1998

[54] ENCODABLE STRIP ATTACHMENT AND REMOVAL APPARATUS

[75] Inventors: Thomas J. Norman, Jr., Richardson, Tex.; Rex W. Shores, Norman; Chanh C. Vo, Oklahoma City, both of Okla.

[73] Assignee: BancTec, Inc., Dallas, Tex.

[21] Appl. No.: 387,571

[22] Filed: Feb. 13, 1995

[51] Int. Cl.$^6$ .............................. B32B 35/00; B65C 5/04
[52] U.S. Cl. ................ 156/249; 156/344; 156/364; 156/499; 156/521; 156/557; 156/584; 156/DIG. 1; 156/DIG. 36; 156/DIG. 51; 271/9.09; 271/9.1; 271/9.13
[58] Field of Search .......................... 156/249, 344, 156/364, 499, 517, 521, 556, 557, 583.5, 584, DIG. 1, DIG. 36, DIG. 51; 271/9.09, 9.1, 9.13

[56] References Cited

U.S. PATENT DOCUMENTS

| | | |
|---|---|---|
| 2,375,330 | 5/1945 | Sperry . |
| 2,808,871 | 10/1957 | Brown .................................. 156/556 |
| 3,128,219 | 4/1964 | Cummings .......................... 156/556 |
| 3,271,227 | 9/1966 | Jaeckel ................................. 156/556 |
| 3,451,872 | 6/1969 | Townsend . |
| 3,770,943 | 11/1973 | Sill . |
| 3,897,299 | 7/1975 | Crouse et al. . |
| 4,448,631 | 5/1984 | Eaton et al. . |
| 4,607,835 | 8/1986 | Wilson et al. . |
| 4,882,004 | 11/1989 | Watson . |
| 4,966,644 | 10/1990 | Clark, Jr. et al. . |
| 5,000,815 | 3/1991 | Hanna .............................. 156/579 X |
| 5,126,547 | 6/1992 | Norman, Jr. . |
| 5,135,115 | 8/1992 | Miller et al. . |
| 5,203,952 | 4/1993 | Clark, Jr. et al. . |
| 5,421,699 | 6/1995 | Guiles et al. ..................... 271/9.13 X |

Primary Examiner—Mark A. Osele
Attorney, Agent, or Firm—Akin, Gump, Strauss, Hauer & Feld, L.L.P.

[57] ABSTRACT

An apparatus and method for applying correction strips with encodable indicia to bank checks and similar documents and for removing previously applied correction strips from checks and reapplying a new correction strip to such a check. The apparatus includes feed mechanism for feeding checks without previously applied correction strips and with previously applied correction strips along parallel feed paths which merge to a common feed path provided by plural endless flexible belts. A rotatable drum is interposed in the common feedpath and is disposed in proximity to a heater element engageable with a heat activatable adhesive band portion of the correction strip for applying the adhesive band to the front lower face of bank checks and similar documents. A rotary cutter is disposed in one of the parallel feed paths for cutting a previously applied correction strip from the lower edge of a check. Feed mechanism associated with the apparatus includes parallel feed slots and endless transport belts for receiving respectively a check without a previously applied correction strip and a check with a previously applied correction strip. An operator actuable switch is provided to select an operating mode wherein a check may have a correction strip applied thereto, be transported through the apparatus without application of a correction strip, and have an old correction strip removed from a check and a new correction strip applied to that check.

37 Claims, 8 Drawing Sheets

ENCODABLE STRIP ATTACHMENT AND REMOVAL APPARATUS

FIELD OF THE INVENTION

The present invention pertains to an apparatus for attaching and removing encodable paper strips with respect to documents. The apparatus is particularly adapted to attach and remove encodable correction strips with respect to bank checks and the like.

BACKGROUND OF THE INVENTION

Enormous numbers of bank checks and similar negotiable instruments pass through the banking system on a daily basis. The processing of bank checks is generally facilitated by reading magnetic or optical indicia encoded along the bottom front longitudinal edge of the check document. If this indicia is damaged, obliterated or improperly encoded, the document cannot be properly processed through automated bank system processing and routing equipment. The substantial number of bank checks, for example, which require repair to the encoded indicia has fostered the development of apparatus for attaching an encodable paper strip to the check so that proper encoded indicia can be applied to the check for automatic processing thereof.

U.S. Pat. Nos. 3,897,299 to Crouse et al.; 4,448,631 to Eaton et al.; 4,966,644 and 5,203,952 to Clark Jr. et al., all assigned to the assignee of the present invention, describe apparatus for attaching and removing encodable material strips with respect to bank checks and the like wherein the encodable strip is attached to the bottom longitudinal edge of the check by an adhesive band or layer which is attached to the back surface of the check. In order to overcome certain problems associated with the use of an adhesive strip which attaches to the back of the check, an encodable strip has been developed in accordance with my U.S. Pat. No. 5,126,547, also assigned to the assignee of the present invention.

The encodable strip described in the '547 patent is provided with an encodable band portion having a print zone in which encoded indicia may be printed thereon and an integrally formed adhesive bearing strip attachment portion for attaching the encodable strip to the lower front longitudinal face of the check. The strip attachment portion includes a segment which extends above the band portion to provide an exposed adhesive surface which is heat-activatable and enables adhesion of the strip to the front side of the check below the damaged or obliterated encoded indicia originally printed on the check. The encodable correction strip described in '547 patent provides for accurate alignment and attachment of the correction strip to the check document, is easily removed from the document, if desired, avoids the obliteration of endorsement and other reference information on the back of the check and is more easily processed by apparatus for attaching and removing the strip with respect to a check document.

Accordingly, there has developed a need to provide an apparatus which is capable of processing checks and similar documents which require encoded indicia thereon and which is operable to attach a correction strip of the type described and claimed in U.S. Pat. No. 5,126,547, to the front face of a check, remove previously attached correction strips from such documents and to remove previously attached correction strips and attach a new correction strip to such documents. Still further, there has been a desire and need to provide an apparatus which will provide for processing of bank checks and similar documents while maintaining the documents in a proper sequence in a stack or bundle and whereby selected ones of such documents, while remaining in their original sequence, may have a correction strip applied thereto, a correction strip removed therefrom, be processed through the apparatus without any strip attachment or removal operation being carried out thereon or have a correction strip removed therefrom and a new correction strip applied thereto. It has been further deemed desirable to provide an apparatus which is capable of carrying out the above-mentioned operations on bank checks and similar documents, which is operable to apply an attachment strip having an adhesive band applicable to the front side of the check document below the previously encoded indicia and wherein the apparatus may be easily controlled by an operator person to select the operation required. It is to these ends that the present invention has been developed.

SUMMARY OF THE INVENTION

The present invention provides a unique apparatus for processing bank checks and similar negotiable documents which have magnetic or optically readable encoded indicia applied thereon for use in processing the document, which apparatus is operable to apply a correction strip to the document, remove a previously applied correction strip from the document, remove a previously applied correction strip and attach a new correction strip to the document or route the document through the apparatus with no operations performed thereon, all such operations being carried on a selected number of documents which are maintained stacked in a predetermined sequence.

In accordance with an important aspect of the invention, an apparatus is provided for attaching a correction strip to a bank check document or the like wherein the correction strip is aligned with a reference edge of the document and an adhesive band portion is placed in registration with the document for adhesive attachment to the document, preferably on the front lower face of the document.

In accordance with another important aspect of the invention, an apparatus is provided for attaching correction strips to bank checks and similar documents and removing previously applied corrections strips from such documents and applying a new correction strip thereto wherein the documents traverse a substantially continuous and common transport path over a major portion of the processing of the document through the apparatus. The apparatus advantageously provides mechanism defining parallel or series arranged path portions at the beginning of the transport path for the check document. An operator of the apparatus may select, at will, a point of introduction of a document to the transport mechanism depending on which operation is to be applied, such as attachment of a correction strip to a check which does not have a strip attached thereto or removal of a correction strip from the check to prepare the check for attachment of a new correction strip or for processing through the apparatus with no further operations performed thereon.

The apparatus has a unique arrangement of transport elements, preferably comprising a series of transport belts and rollers which provide initial parallel or series arranged path portions and a common path portion in communication with the initial path portions. In particular, an improved transport belt arrangement is utilized at least in the initial portion of the transport path to properly orient a document with respect to a reference surface. A transport belt is trained over spaced apart rollers, at least one of which is mounted for eccentric or orbital movement about an axis of rotation, to impart a change in magnitude of driving forces acting on the document to effectively move a document along the transport path as well as to be biased into engagement with an alignment or reference surface.

In accordance with another aspect of the present invention, an apparatus is provided which includes improved means for aligning a bank check, or a similar document, for attachment of a correction strip thereto and wherein the correction strip is also aligned properly with a leading side edge of the document and for attachment to a bottom longitudinal edge of the document.

Still further in accordance with the present invention, the correction strip attachment apparatus includes an improved heater arrangement for applying heat to a heat activatable adhesive on the correction strip.

In accordance with yet a further aspect of the present invention, a check correction strip application and removal apparatus is provided which has unique means for feeding or loading checks in the apparatus, and a conveniently located switch for operator control of the apparatus whereby the apparatus may be operated in several modes in accordance with the invention and is under complete control of an operator in selection of the operating mode. The selection can be made quickly and conveniently as the check documents are fed to the apparatus for processing thereby.

The invention provides a unique apparatus and method for processing bank checks and similar documents which have encodable indicia thereon wherein such documents may be sequentially processed through the apparatus and maintained, stacked or arranged in their original sequence and wherein each document may have a correction strip applied thereto, a correction strip removed therefrom and a new correction strip applied thereto, a correction strip removed therefrom only or the document may be transported through the apparatus with no strip removal or attachment operation carried out thereon. The apparatus is capable of carrying out the above-mentioned operations in a single pass of the document through the apparatus and wherein the operating mode of the apparatus is under operator control.

Those skilled in the art will further appreciate the above-mentioned advantages and superior features of the invention together with other important aspects thereof upon reading the detailed description which follows in conjunction with the drawing.

DESCRIPTION OF THE PREFERRED EMBODIMENTS

Figure 1:
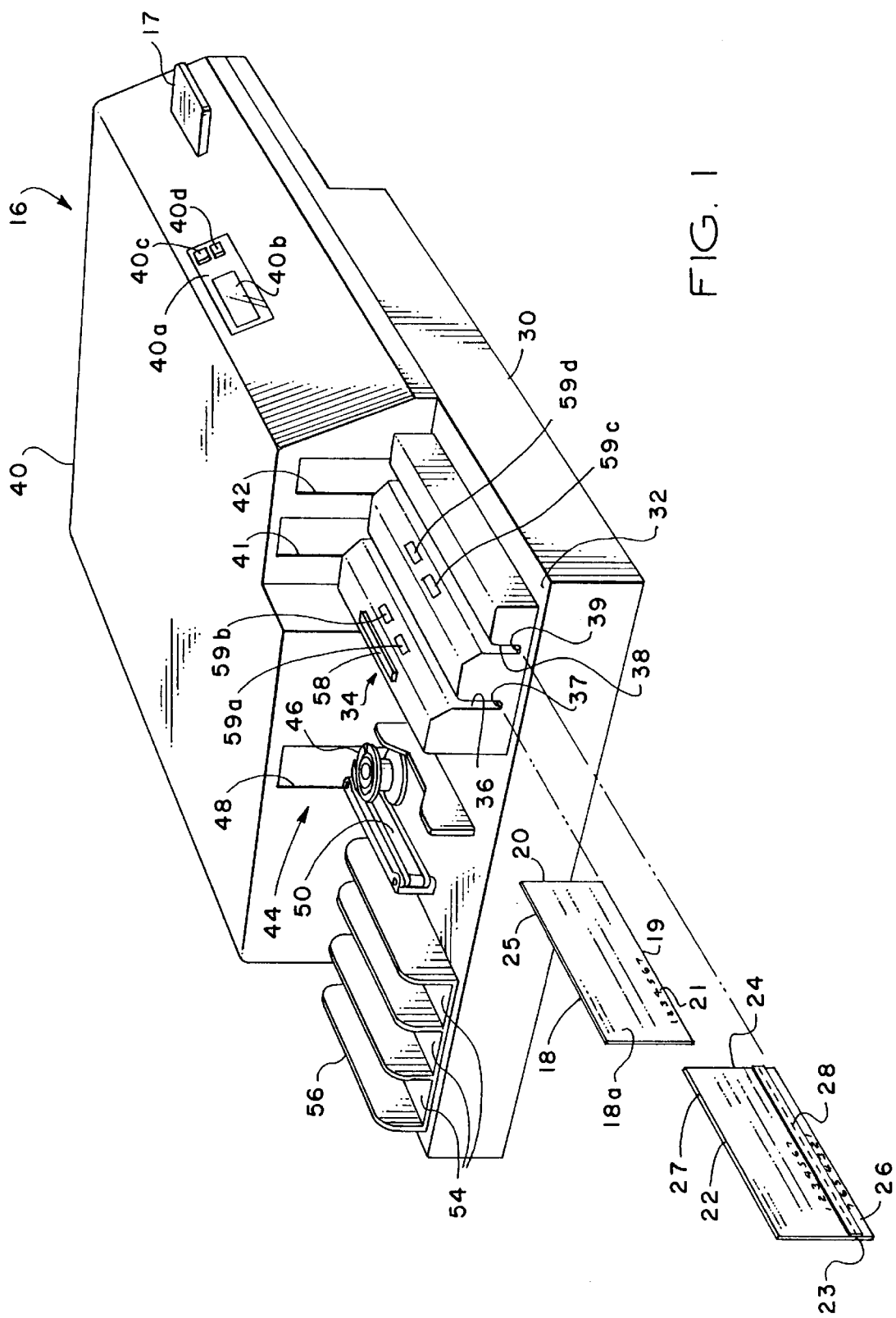
FIG. 1 is a perspective view of one preferred embodiment of the apparatus of the present invention.

In the description which follows like parts are marked throughout the specification and drawing with the same reference numerals, respectively. The drawing figures are not necessarily to scale and certain elements may be shown in somewhat generalized or schematic form in the interest of clarity and conciseness.

Referring to FIG. 1, there is illustrated a perspective exterior view of an apparatus in accordance with the invention and generally designated by the numeral 16. The apparatus 16 is adapted to process documents such as a bank check 18 which has a front face 18a, a bottom longitudinal side edge 19, a right transverse side edge 20 and magnetic or optically readable indicia 21 disposed on the front side of the check along and above the edge 19. The apparatus 16 is operable to attach an elongated strip of paper or similar material to the check 18 generally aligned with and extending below the edge 19 whereby machine readable indicia may be placed on the strip to replace the damaged indicia 21. In particular, the apparatus 16 is adapted to attach a correction strip to the check 18 of a type described in my U.S. Pat. No. 5,126,547, the subject matter of which is incorporated herein by reference.

The apparatus 16 is also operable to process a check document 22 having a longitudinal bottom edge 23 and a right transverse side edge 24 and which already has a correction strip 26 attached thereto, as illustrated. The apparatus 16 is operable to remove the strip 26 from the check 22 and, if desired, add a new correction strip to the check including the type of strip described in the '547 patent. Such operation may be required if the indicia on the strip 26, for example, is damaged or obliterated or if the routing of the check 22 through the banking system must be changed for one reason or another. For sake of discussion herein, the strip 26 is preferably the type described in U.S. Pat. No. 5,126,547 and has an adhesive strip attachment portion 28 disposed thereon which is activated by heat and which is engageable with the front lower face of the check 22 just above the edge 23 for securing the strip to the check.

The apparatus 16 includes a frame 30 having a generally horizontal support surface 32 formed thereon and check document receiving and feeding means 34 supported on the surface 32 and including elongated parallel slots 36 and 38 formed therein for receiving the respective checks 18 and 22. As shown in FIG. 1, the slot 36 has a longitudinal bottom alignment or reference surface 37 which is spaced about 0.625 inches higher from the surface 32 than a longitudinal bottom reference surface 39 of the slot 38. In this way the bottom longitudinal side edges 19 and 23 of the checks 18 and 22, respectively, are spaced the same distance from the surface 32, since the check 22 has the correction strip 26 already applied thereto.

The apparatus 16 is also provided with a liftable cover 40 which is operable to enclose a substantial portion of the check transport and processing mechanism which will be described in further detail herein. The check receiving and feeding slots 36 and 38 are aligned with respective openings 41 and 42 in the cover 40 through which the checks 18 and 22 may be fed along parallel paths to be described herein which merge into a common transport path which terminates at a stacking mechanism, generally designated by the numeral 44 in FIG. 1. The check stacking mechanism 44 is preferably of the type described in U.S. Pat. No. 5,135,115 to Miller et al., assigned to the assignee of the present invention, and which is incorporated herein by reference. Basically, the stacking mechanism 44 includes a slotted, rotatable transport disk 46 aligned with an opening 48 in the cover 40 and disposed adjacent a suitable motor driven endless transport belt 50 whereby, when checks have been processed by the apparatus 16, they are stacked by the mechanism 44 against a suitable, spring biased, movable document support plate 52. As also shown in FIG. 1, a plurality of document storage slots 54 are formed by a suitable bracket 56 also disposed on the frame 30. The apparatus 16 includes a handle 17 for lifting the cover 40 and a window 40a is formed in the cover 40 for viewing a suitable display 40b, indicating the mode of operation of the apparatus 16. A transport on-off switch 40c and a basic operating mode switch 40d are disposed adjacent the display 40a.

Still further, as shown in FIG. 1, an operator controlled switch 58, herein sometimes referred to as a "bump bar," is disposed on the check feed means 34 at a convenient location for use by an operator of the apparatus 16 to control modes of operation which will be discussed in further detail herein. Basically, an operator of the apparatus 16 may, after selecting a mode of operation, place check documents which do not have a correction strip attached thereto, one at a time, at will, in the slot 36 for feeding through the apparatus in a manner to be described further herein. The operator may also place check documents having a correction strip already applied thereto in the slot 38 for feeding through the apparatus 16, at will. Those skilled in the art will recognize that the feeding station or means 34 and the check document receiving slots 36 and 38 may also be disposed in proximity to automated document feeding mechanism, not shown, which prefeeds the check documents 18 and 22 into the respective slots 36 and 38.

Figure 2:
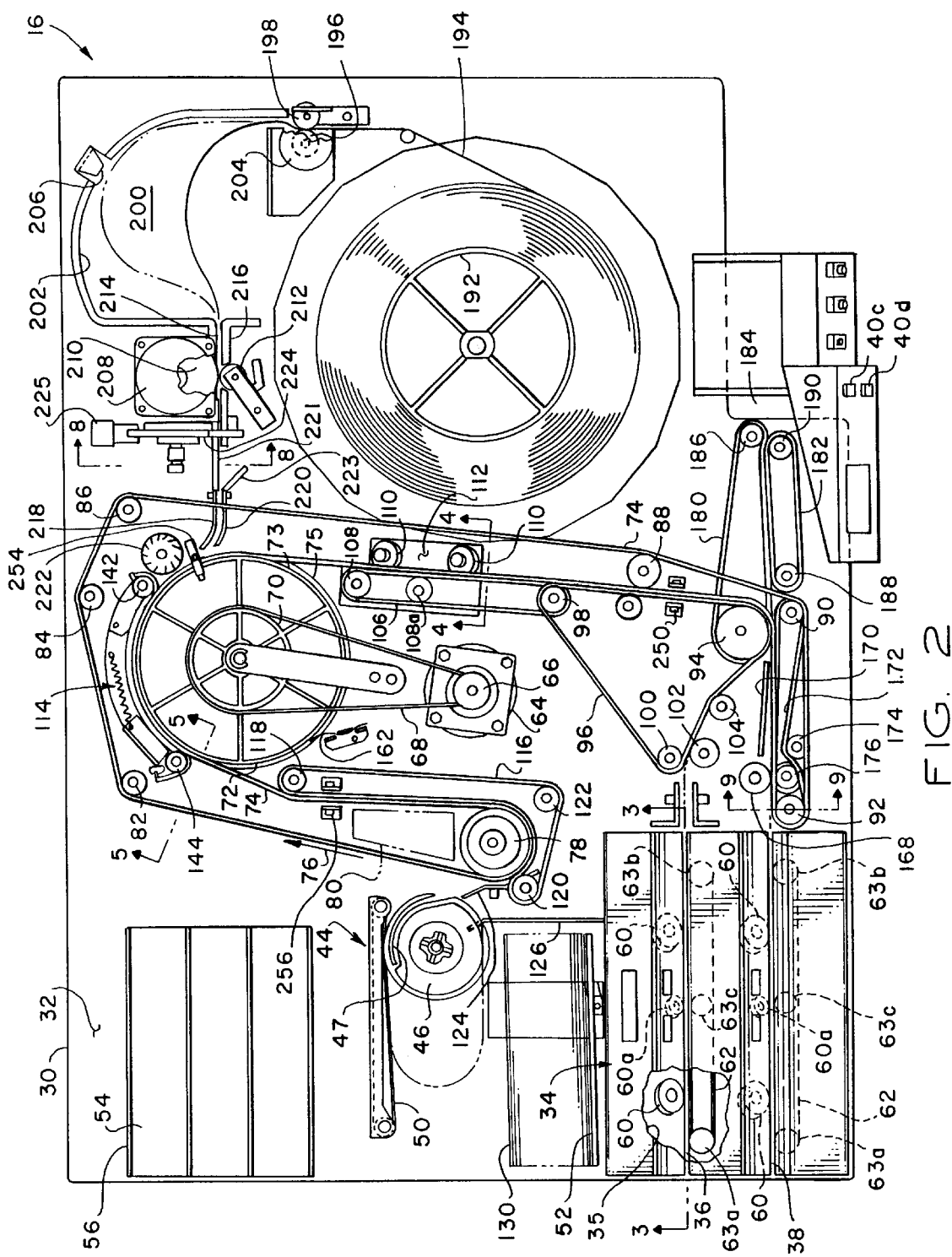
FIG. 2 is a top plan view of the apparatus shown in FIG. 1 with a protective cover removed therefrom.

Referring now to FIG. 2, the apparatus 16 is shown with the cover 40 removed from the frame 30 to illustrate a substantial part of the mechanism for processing checks of the types previously described. The document feeder station 34 is shown with a cover 35 disposed thereon and partially broken away in the vicinity of the slot 36 to show one of two spaced apart biasing rollers 60 which are canted at a suitable angle to cooperate with an endless motor driven drive belt 62, trained around spaced apart rollers 63a and 63b, to transport a document through the slot 36 from left to right, viewing FIG. 2, and to bias the document downwardly into engagement with the surface 37 so that the document is properly aligned for further transport through the apparatus 16. In like manner the slot 38 is disposed in proximity to a second set of biasing rollers 60, as shown in FIG. 2, and a second motor driven endless drive belt 62 trained over spaced apart rollers 63a and 63b to transport a check document such as the check 22 through the slot 38 from left to right, viewing FIG. 2, and to also bias the bottom edge of the correction strip 26 into engagement with the reference surface 39. Further details of the feed mechanism comprising the belts 62 and roller pairs 63a and 63b are described hereinbelow in conjunction with FIGS. 16 through 18.

Referring further to FIG. 2, the apparatus 16 includes a suitable drive motor 64 disposed on frame 30 and drivingly connected to a pulley 66 which rotates about an axis normal to the plane of the paper of FIG. 2 and is drivingly connected to a cog belt 68. The belt 68 is trained over a pulley 70 drivingly connected to a correction strip attachment and support drum 72. The drum 72 is rotatably supported on the frame 30 for rotation about an axis normal to the surface 32, which surface is co-planar with the plane of the paper of FIG. 2. The drum 72 is in driving engagement with an endless flexible transport belt 74 whose direction of travel is indicated by the arrow 76 in FIG. 2. Starting just upstream of the arrow 76, with respect to the direction of travel of the belt 74, the belt is trained over a rotatable roller 78 adjacent to a correction strip printing station, generally designated by the numeral 80. Now, following the direction of travel of the belt 74 from the arrow 76, the belt is trained over a roller 82, then over a roller 84, then over rollers 86 and 88, then over rollers 90 and 92, and then partially around a roller 94 and back to engagement with a peripheral drive surface 73 of the drum 72. The belt 74 defines a substantial portion of the transport path followed by a check document to which a correction strip is to be attached. The belt 74 also defines a substantial portion of the transport path of a check from which a correction strip is removed by the apparatus 16 and to which a new correction strip may be attached, or the check document may be processed through the apparatus 16 without attachment of a correction strip.

The transport path for a check such as the check 18 begins with the slot 36 and merges with the common transport path portion defined by the belt 74 under guidance of a second flexible endless transport belt 96 which is trained over the roller 94 and is drivenly engaged with the belt 74 between the roller 94 and a roller 98. The belt 96 is trained over a third roller 100 and is also engaged with spaced apart guide rollers 102 and 104 which are positioned to guide the leading edge of a check document leaving the slot 36 and to guide the check toward the belt 74 at the roller 94. Accordingly, a check leaving the slot 36 is guided between the belt 96 and the spaced-apart rollers 102 and 104, then between the belts 96 and 74 along a portion of the transport path between rollers 94 and 98. As the leading edge of a check passes along the path of belt 74 beyond roller 98 it is further guided by a third endless flexible transport belt 106 which is trained around the roller 98 and a roller 108. The belt 96 is substantially co-planar with the belt 74 and the belt 106 is disposed for traversal in a plane between the plane of traversal of the belts 96 and 74 and the plane the surface 32.

Figure 4:
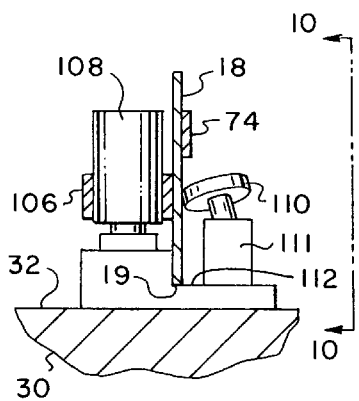
FIG. 4 is a detail section view taken generally from the line 4—4 of FIG. 2.
Figure 10:
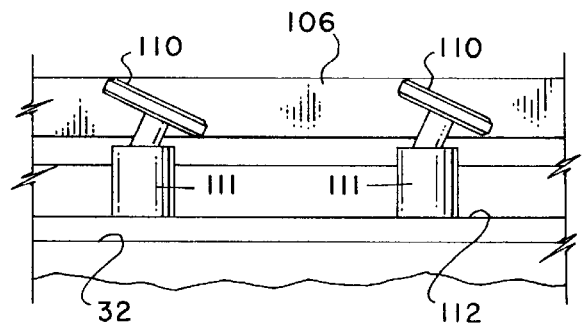
FIG. 10 is a detail view taken generally from the line 10—10 of FIG. 4.

Referring further to FIG. 2, and also FIGS. 4 and 10, as a check 18, or a check 22 after removal of the strip 26, passes along the transport path between the belts 74 and 106 it is engaged by two spaced apart canted rollers 110 which are disposed at a plane of rotation such that they engage the check, as shown in FIG. 4, and bias it into engagement with a planar guide surface 112. Accordingly, for example, the longitudinal bottom edge 19 of check 18 is aligned with the surface 112 as shown in FIG. 4. This guide surface 112 assures that the check is properly spaced from the surface 32 as it approaches the strip attachment drum 72 to permit a correction strip to be moved into position directly adjacent to and below the edge 19. Moreover, the rollers 110 are each supported on respective members 111 for rotation at an acute angle with respect to the surface 112 for urging a check document toward engagement with that surface as the document passes between the rollers 110 and the belt 106. When a document is not present between the rollers 110 and the belt 106, the rollers are engaged with the belt and are rotatably driven thereby. In this way, as a check document moves between a roller 110 and the belt 106, the roller is already rotating, advantageously grips the check document and biases the check document downward toward engagement with the surface 112. The provision of spaced apart rollers 110 disposed as shown in FIG. 10 assures that the check document is urged into engagement with the reference surface 112 along the bottom longitudinal side edge of the document.

As a check passes from between the belts 74 and 106 to a position between the belt 74 and the surface 73 of drum 72, the check is carried around the periphery of the drum and in proximity to an adhesive heater, generally designated by the numeral 114 in FIG. 2. The heater 114 will be further described hereinbelow in conjunction with FIGS. 6 and 7. After a check has a correction strip attached thereto, or otherwise traverses around the drum 72 and engaged with the belt 74, it approaches yet another endless flexible guide belt 116 which is trained around spaced apart rollers 118, 78, 120 and 122. The check passes through the printing station 80, guided between the belts 74 and 116, around the roller 78 and into a slot 47 formed in the rotatable check stacking disk 46. As a check emerges from between the belts 74 and 116, it is guided by a guideplate 124 into the slot 47 and the disk 46 then rotates in a counterclockwise direction, viewing FIG. 2, until the leading edge 20 of a check 18, for example, engages a stop plate 126. Further rotation of the disk 46 in conjunction with the belt 50 traverses the trailing end of the check 18 such as to cause it to swing around and be placed in a stack 130, as indicated in FIG. 2, which is supported by the plate 52.

Figure 5:
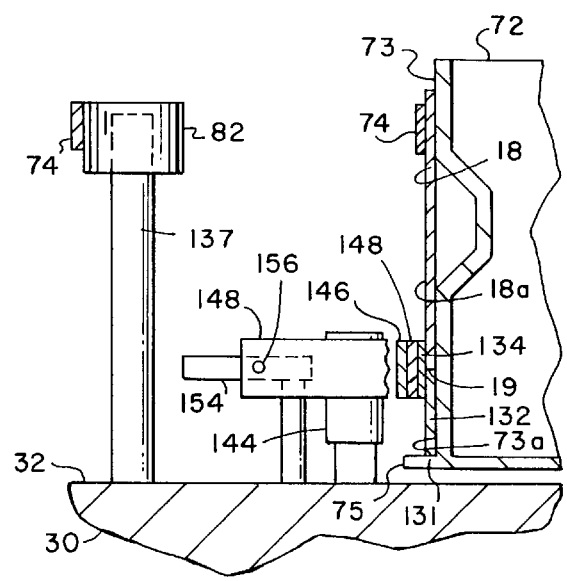
FIG. 5 is a detail section view taken generally from the line 5—5 of FIG. 2.
Figure 6:
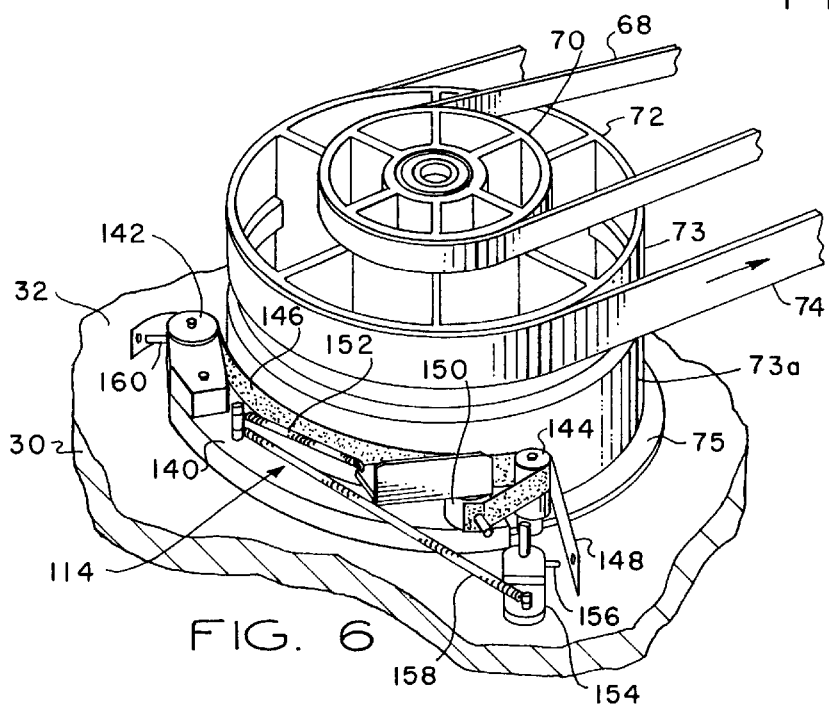
FIG. 6 is a detail perspective view of the correction strip attachment drum and heater assembly.
Figure 7:
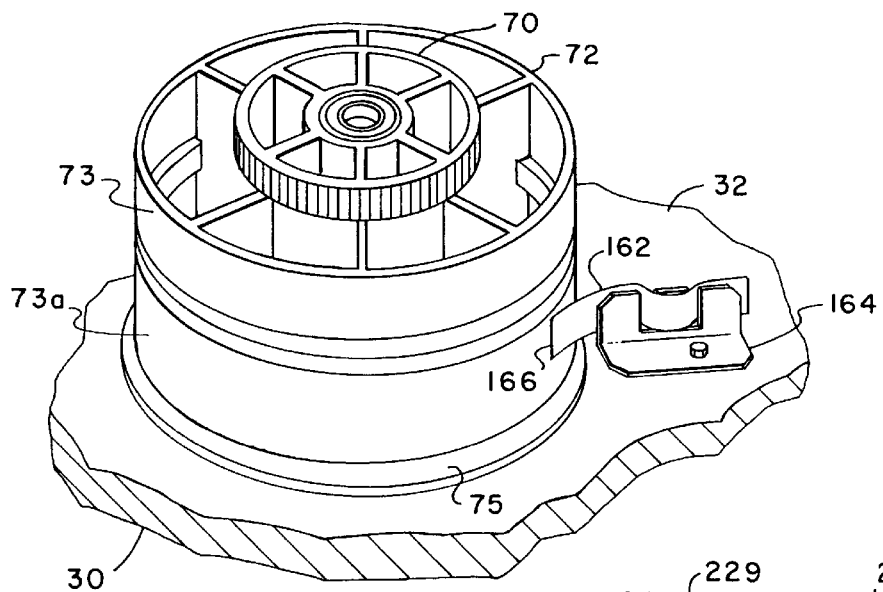
FIG. 7 is a perspective view of the drum shown in FIG. 6 from an angle which illustrates an adhesive removal scraper engaged with the drum surface.

Referring now to FIGS. 2 and 5, the drum 72 has a circumferential correction strip positioning flange 75 formed generally at the bottom edge thereof, see FIGS. 6 and 7 also. As shown in FIG. 5, the flange 75 operates to locate and guide the longitudinal bottom edge 131 of a new correction strip 132 which is to be attached to the check 18 by an adhesive band 134, for example. As a correction strip 132 passes onto and becomes engaged with the drum 72 it also moves into registration with a check document 18, for example, at the bottom edge 19 of the check document. The correction strip 132 is pressed into engagement with the surface 73a of the drum 72 by a heater band element to be described in further detail hereinbelow and comprising part of the heater 114.

Referring now to FIG. 6, the drum 72 is disposed adjacent to the heater 114 which includes a suitable base member 140 supporting spaced apart posts 142 and 144 around which is trained an elongated heating element 146. The heating element 146 is preferably formed of a flexible heat conductive material such as Kapton brand plastic having a suitable electrical resistance heating member, not shown, secured thereto. The heater 114 also advantageously includes a thin flexible metal wear strip 148 disposed between the heating element 146 and the drum surface 73a and engageable with the adhesive band portion 134 of a correction strip 132, see FIG. 5 also, whereby the working life of the heating element 146 is substantially increased.

As shown in FIG. 6, the band-like heating element 146 is secured to a pivotable post 150 mounted on the base 140 and operable to be biased to rotate in a clockwise direction, viewing FIG. 6, by a suitable tension spring 152. In like manner, the wear strip 148 is adapted to be secured to an anchor member 154 at a pin 156. The anchor member 154 is supported for pivotal movement on the frame 30 and is urged to apply tension to the wear strip 148 by a suitable tension spring 158. The opposite ends of the respective heating element 146 and wear strip 148 are operable to be secured to an anchor pin 160, FIG. 6, disposed on the support post 142. The aforedescribed arrangement of the heater 114 advantageously biases the heating element 146 and the wear strip 148 against an adhesive band portion 134 of a correction strip 132 to be attached to a check document 18, for example, wherein the adhesive band portion is applied to the front face 18a along the lower portion thereof adjacent to edge 19.

Referring briefly to FIG. 7, the drum 72 is provided with a flexible band-like adhesive scraper member 162 supported by a suitable bracket 164 mounted on the frame 30 as illustrated. The adhesive scraper member 162 has a leading edge 166 engaged with the surface 73a of the drum 72 in the vicinity of where the adhesive band 134 is disposed as the band and correction strip are transported by the drum and drive belt 134 during application of the correction strip to a check document. Excess adhesive heated by the heater 114 may tend to squeeze through any minute gap between the bottom edge of the check document and the top cooperating edge of the correction strip and be deposited on the drum surface 73a. Accordingly, the adhesive scraper 162 is configured to bias the leading edge 166 into engagement with the drum surface 73a to remove adhesive residue therefrom.

Figure 9:
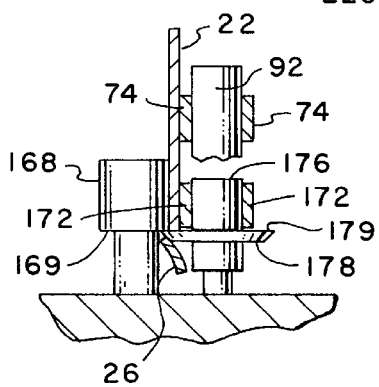
FIG. 9 is a detail section view taken from the line 9—9 of FIG. 2.

Referring again to FIG. 2, and also FIG. 9, a parallel transport path portion for a check document having a correction strip already attached thereto is defined by the slot 38 and by a portion of the belt 74 extending between the rollers 92 and 94. An anvil roller 168 is disposed adjacent to the belts 74 and yet another flexible endless belt 172 just downstream of the roller 92 in the direction of transport of the belt 74 and is operable to guide the leading edge of a check document, such as a check 22, between the roller 168 and the belt 172 so that the check document travels toward the roller 94. A suitable guide plate 170 is disposed on the frame 30 and extends upwardly from and in a direction generally normal to the surface 32 to aid in guiding the leading edge of a check document to the pinch point between the belt 74 and the belt 96 at the roller 94. The parallel paths taken by a check document starting in the feed slot 36, or a check document starting in the feed slot 38, merge at the pinch point between the belts 74 and 96 at the roller 94 and the transport path for a check document being processed by the apparatus 16 is a common path from the aforementioned pinch point to the stacking mechanism 44.

Referring further to FIGS. 2 and 9, the belt 172 is trained around the rollers 90 and 92, over an idler roller 174, and is drivingly engaged with a roller 176 including a cylindrical cutter or knife edge 178. As shown in FIG. 9, the knife edge 178 is defined in part by a planar side surface 179 which overlaps a bottom transverse surface 169 of the anvil roller 168. This overlap of the surfaces 179 and 169 provides a scissors-like cutting action which is operable to cut a strip 26 from a check document 22, as shown in FIG. 9, as the check document is transported by the belt 172 and roller 176. The roller 168 is preferably supported in such a way that it is resiliently biased downward into engagement with the surface 179. Accordingly, as a check 22 progresses to the portion of the transport path defined by the belts 74 and 96, a correction strip 26 is removed therefrom. The old, cutoff correction strip 26 is guided by a suitable slot extending from slot 38 toward a correction strip transport and delivery mechanism described hereinbelow.

As shown in FIG. 2, the apparatus 16 still further includes two endless flexible belts 180 and 182 which are cooperable to receive a correction strip which has been cut by the knife 178 to transport the strip toward a suitable receptacle 184. The belt 180 is drivenly engaged with and trained around roller 94 and an idler roller 186. The belt 182 is trained around spaced apart idler rollers 188 and 190, FIG. 2, which are supported for rotation on the frame 30 in a manner similar to the belt drive and idler rollers previously discussed. As shown in FIG. 2, the belts 180 and 182 are disposed for traversal in a plane parallel to the surface 32 and between the surface 32 and the belts 74 and 96. As shown in FIGS. 2 and 9, the belt 172 is disposed for traversal in a plane parallel to the surface 32 and between the plane of transport of the belt 74 and the surface 32. The belt 172 is driven by the belt 74 through rollers 90 and 92.

Referring further to FIG. 2, the apparatus 16 includes a correction strip supply reel 192 rotatably supported on the frame 30 and adapted to dereel a continuous length 194 of correction strip material for forming, seriatim, correction strips such as the aforementioned strips 132, for example. The correction strip material 194 is threaded between a drive roller 196 and cooperating idler roller 198 into a space 200 defined by a plenum wall 202. The roller 196 is suitably drivenly connected to a drive motor 204. A sensor 206 is disposed in the wall 202 to sense the presence of the continuous length 194 of correction strip material to control operation of the motor 204 to feed the continuous length of strip material into the plenum 200. Accordingly, a substantial amount of slack correction strip material 194 may reside in the plenum 200 to prevent unwanted tension on the correction strip material downstream of the drive motor 204 in the direction of movement of the correction strip material. The reel 192 may be provided with suitable braking means, not shown, operable in conjunction with motor 204 to prevent unwanted dereeling of correction strip material 194.

A correction strip feed motor 208 is disposed on the frame 30 for driving engagement with a feed roller 210 which is cooperable with an idler roller 212 to feed correction strip material 194 along a path defined by a slot 214 formed between an extension of the wall 202 and a cooperating wall 216. The feed path of the correction strip material 194 extends to and between spaced apart guide members 218 and 220 which operate to guide the leading edge of a correction strip toward engagement with the drum 72. As the leading edge of a correction strip approaches the drum 72 it is engaged by a canted biasing roller 222 supported on the frame 30 and operable to bias the longitudinal bottom edge of the correction strip against the drum flange 75 to aid in aligning the correction strip with the check document to which it is to be attached.

Figure 8:
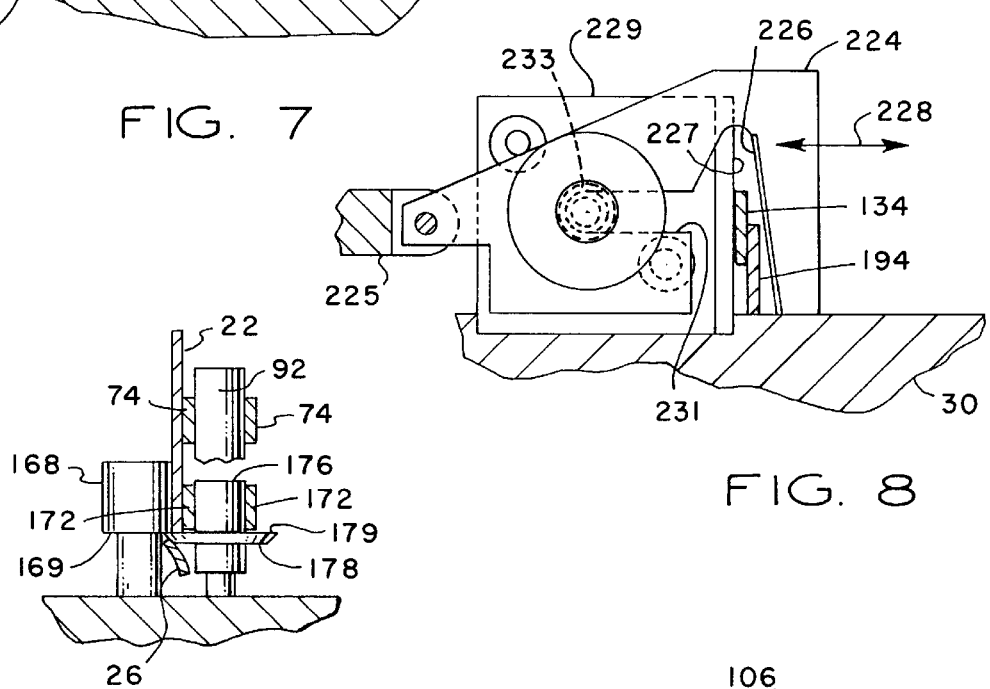
FIG. 8 is a detail view taken from the line 8—8 of FIG. 2.

Referring also to FIG. 8, the apparatus 16 includes a unique correction strip shearing or cutting mechanism for cutting predetermined lengths of correction strip from the continuous length of strip material 194. The strip cutting mechanism includes a movable knife blade member 224 interposed between the drive roller 210 and guide plates 218 and 220. The knife member 224 has a cutting edge 226 formed thereon and which is disposed at a slight acute angle with respect to a cooperable cutting edge 227 formed on a stationary member 229. Knife member 224 is operable to be linearly reciprocated along a path 228 by a solenoid actuator 225, FIG. 2, toward and away from the cutting edge 227. The knife member 224 is characterized as a generally flat plate-like member having a slot 231 formed therein and cooperable with a spring biased support pin 233 secured to the member 229 to permit reciprocal movement of the knife member 224 along the path indicated by the arrow 228. Thanks to the configuration of the cooperable scissors-like cutting edges 226 and 227, a correction strip is cut from the continuous length of strip material 194 effectively and with a clean transverse side edge. The stationary knife member 229 is suitably supported on the frame 30. The feed path of a correction strip between the motor-driven roller 210 and the guide plates 218 and 220 is further defined by guide plates 221 and 223 which are configured to provide a space for slight bulging of the trailing end of the correction strip as it is fed toward the drum 72 for a purpose to be described further herein.

Figure 3:
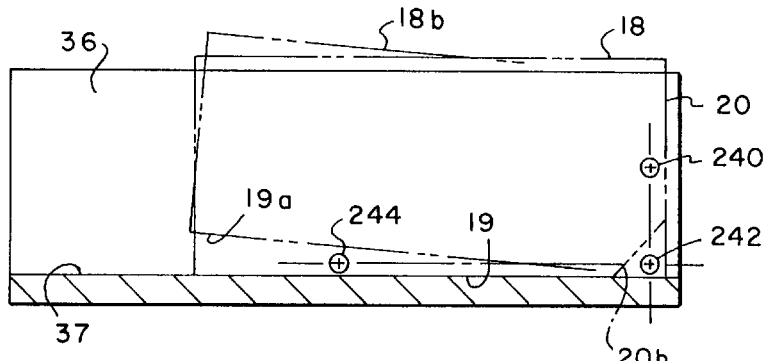
FIG. 3 is a detail view taken generally from the line 3—3 of FIG. 2.

The apparatus 16 is also advantageously provided with several sensors which operate in conjunction with a controller to effect operation of the apparatus to process check documents and the like in accordance with the present invention. Referring to FIGS. 2 and 3, the feed station 34 has plural sensors 240, 242 and 244 which are operable to sense whether or not a check document 18, for example, is properly aligned in the slot 36 so that the check bottom edge 19 is engaged with the slot bottom reference surface 37. The sensors 240 and 242 also cooperate to determine whether or not the edge 20 of the check 18 has a cutaway or "dog eared" portion 20*b*, for example. The sensors 240, 242 and 244 may be operable to determine the presence or absence of the document 18. For example, if the sensors 240 and 242 sense the presence of the document 18, simultaneously, it is assumed that the dog eared edge 20*b* does not exist and that the document edges 19 and 20 intersect at substantially right angles. If the sensors 240, 242 and 244 all sense the presence of the document 18 as it is fed along the slot 36 it is assumed that the document does not have a defective leading edge 20 and that the edge 19 is properly aligned in the slot 36 in engagement with the surface 37. An alternate defective position of the document 18 is shown in FIG. 3, indicated by the numeral 18*b*, and showing the defective position of the bottom edge 19 as indicated by numeral 19*a*. In this position sensor 244 does not detect the presence of the check 18 and, accordingly, a fault signal or cession of feeding of check 18 is commenced. A similar set of sensors 240, 242 and 244 is associated with the feed slot 38 to indicate whether or not a check document with a correction strip applied thereto is in proper registration with the reference edge or surface 39.

Figure 16:
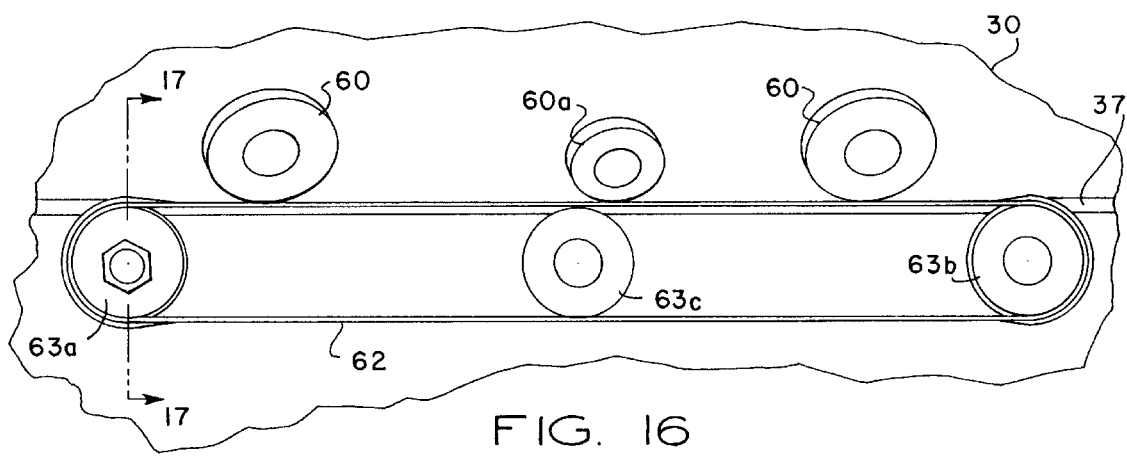
FIG. 16 is a detail plan view of the drive belt arrangement for the document feed mechanism.
Figure 17:
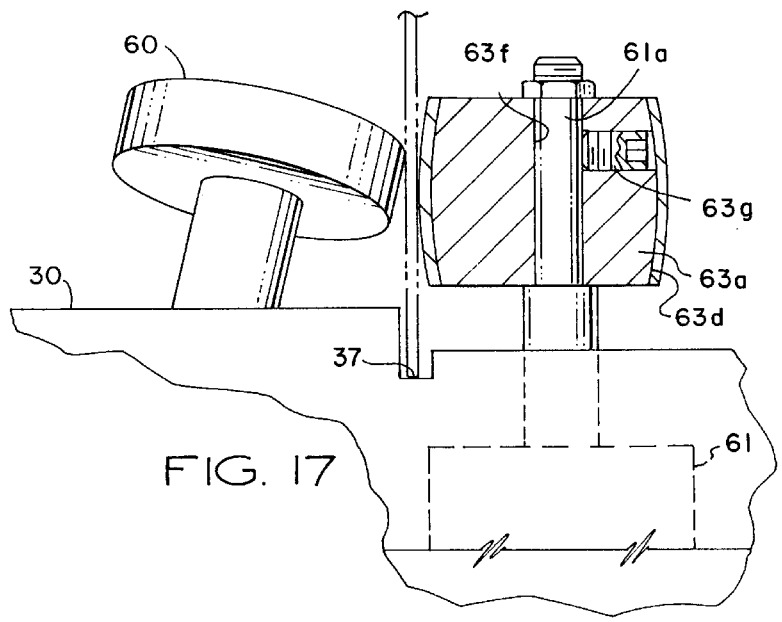
FIG. 17 is a section view taken from the line 17—17 of FIG. 16.

Referring now to FIGS. 16 and 17, further details of the feed mechanism comprising the endless belt 62 and the spaced apart rollers 63*a* and 63*b* are illustrated. As shown in FIGS. 16 and 17, the belt 62 is trained over rollers 63*a* and 63*b*, both of which have a crown or somewhat barrel shape in longitudinal section to assist in centering the belt 62 on the rollers. A flat cylindrical idler roller 63*c* is preferably interposed midway between the rollers 63*a* and 63*b* and also approximately midway between the canted rollers 60. A stabilizing and biasing roller 60*a* is also preferably provided adjacent to the idler roller 63*c* to further stabilize a document being fed by the feed mechanism described and illustrated in FIGS. 16 and 17. FIGS. 16 and 17 illustrate how the rollers 60, as well as the roller 60*a*, are disposed for rotation such that when they engage a check document, a reaction force is exerted on the document which tends to bias the document down into engagement with the reference edge or surface 37 or 39. FIG. 17 also illustrates a suitable drive motor 61 suitably mounted for rotatably driving the roller 63a through a cylindrical shaft 61a. The roller 63a is suitably keyed to the shaft 61a by a set screw 63g.

Figure 18:
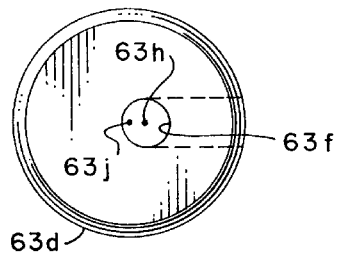
FIG. 18 is an end view of one of the feed mechanism drive rollers.

An important aspect of the document transport means comprising the respective feed mechanisms each defined by a belt 62, rollers 6a, 63b and 63c and the canted biasing rollers 60, and 60a resides in providing at least the drive roller 63a to be mounted on its shaft 61a for somewhat eccentric or orbital movement with respect to the central longitudinal axis of the shaft. FIG. 18 is an end view of the roller 63a showing a crowned belt engaging outer cylindrical or "barrel" shaped surface 63d and a shaft receiving bore 63f whose axis 63h is slightly eccentric with respect to the central axis 63j of the surface 63d. For a roller 63a having a length of about 0.62 inches and a diameter of 0.75 inches, an eccentricity of about 0.04 inches provides an advantageous driving force on a check document transported by the belt 62 and between the belt and the canted rollers 60.

The eccentric mounting of the roller 63a provides a driving force on a document which changes in magnitude due to the eccentric or orbital motion of the roller, which causes a change in the direction of the resultant driving force with respect to time. Two forces are applied to a document by a drive mechanism described above, namely, a downward force acting on the document to move it toward the surface 37 or 39 and a forward force to move it along the transport path. When the eccentric drive roller 63a biases the belt 62 towards the rollers 60, the aforementioned downward force dominates to cause the resultant driving force to move the document in a downward direction toward the surface 37 or 39. When the belt 62 is in relatively light contact with the rollers 60 resulting from the eccentric movement of the roller 63a, the so-called forward force, tending to move the document along the transport path in the direction of movement of the belt, tends to dominate the forces acting on the document thereby causing the document to move forward. The resultant change in force components tending to move the document downward toward the alignment surfaces 37 or 39 provides an improved transport effort acting on the document which forces the document into engagement with the surfaces 37 or 39 and yet to be moved forwardly along the transport path without stalling in the slots 36 or 38.

Referring again to FIG. 2, the apparatus 16 includes a suitable sensor 250 disposed along the document transport path between the rollers 94 and 98 for detecting the presence and length of a check document being transported toward the drum 72. The sensor 250 is operable to provide suitable signals indicating the presence and length of a check document to a controller, not shown, disposed on the frame 30. Still further, the apparatus 16 includes a sensor 254 disposed adjacent to the drum 72 and at the juncture of the transport path of the check document with the transport path of the correction strip as the latter approaches the drum 72. The sensor 254 operates to sense the presence of the leading edge 20 of a check document 18, for example, to effect further feeding of a correction strip into position to be attached to the check document as both the check document and the correction strip traverse over the drum 72. Still further, a sensor 256 is provided between the rollers 118 and 120 downstream of the drum 72 in the direction of transport of a document through the apparatus for sensing the presence or absence of a correction strip, if such has been ordered to be applied to a document. Accordingly, the apparatus 16 may be placed in a fault mode if it was intended to apply a correction strip to a document and such has not been done. The sensor 256 may also operate to provide a signal to the print station 80 to apply certain indicia to a correction strip which has been attached to the bottom of a check, for example.

An important advantage of the present invention resides in the provision of various operating modes to which the apparatus may be subjected. This important advantage includes the provision of the switch 58 which is disposed at the feed station 34 and may be actuated, at will, by an operator of the apparatus 16 to change the operating mode. Referring briefly to FIG. 1, the feed station 34 includes respective visual indicators 59a and 59b disposed adjacent to the feed slot 36. These indicators are illuminated, respectively, when the apparatus 16 is in an operating mode to add a correction strip to a check document and to bypass a check document through the apparatus without adding a correction strip. Still further, visual indicators 59c and 59d are disposed adjacent the feed slot 38 and are illuminated, respectively, when the apparatus 16 is in an operating mode to remove a correction strip from a check document placed in the slot 38 and to add a new strip to a document placed in the slot 38. Accordingly, depending on the operating mode selected by actuation of the switch 58, one or more of the visual indicators 59a, 59b, 59c and 59d will be illuminated to indicate to the operator what event will take place if a document is placed in either the slot 36 or the slot 38.

Still further, the apparatus 16 may be operated in a so-called protected mode or unprotected mode by actuation of the switch 40d. If the so-called protected mode of operation is selected, the feed mechanism associated with the feed slot 38 is de-energized and a document placed in that slot will not be carried into the continuous transport path. If the apparatus 16 is selected for operation in the unprotected mode, then the feed mechanisms associated with both slots 36 and 38 are, each, operating continuously and a document placed in either one of these slots will be fed toward the common transport path defined by the belt 74. Accordingly, a document placed in the slot 38 will have a correction strip removed therefrom as the document passes into engagement with the knife edge 178 or, if the document does not have a correction strip thereon, a portion of the document may be severed.

Figure 13:
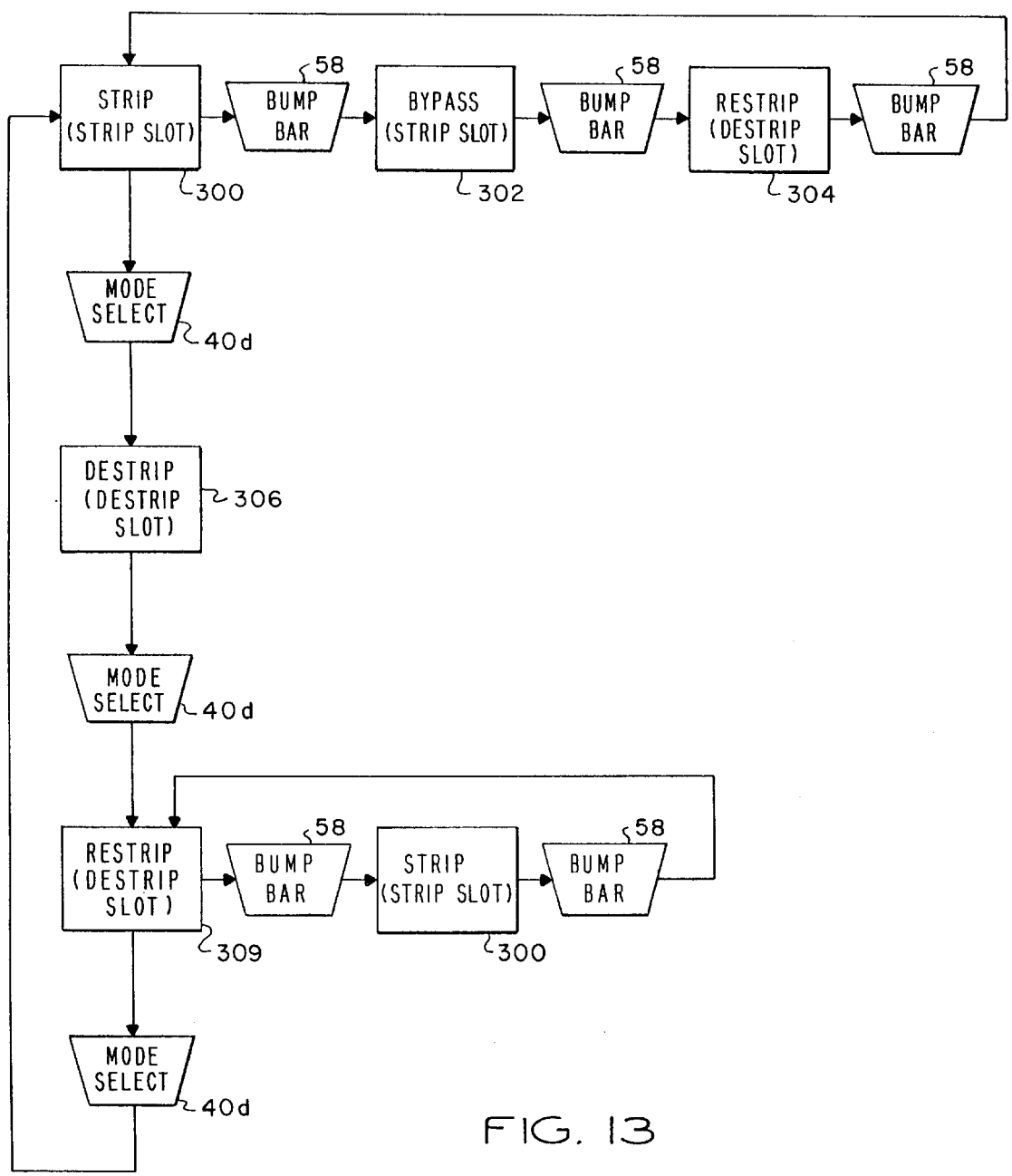
FIG. 13 is a schematic diagram illustrating certain operating modes of the apparatus of the invention.

Referring now to FIG. 13, the diagram illustrates the various operating modes which may be selected by actuation of the switch 58. As shown in FIG. 13, a primary operating mode may be selected as indicated by numeral 300 and which mode may be provided by placing the apparatus 16 in a protected operating mode by suitable actuation of the switch 40d. With the apparatus 16 in a protected operating mode and the mode 300 in effect, the indicator 59a will be illuminated and the feed mechanism for slot 36 will be operable. Accordingly, documents placed in the "strip" slot 36 will be fed through the apparatus 16 and a correction strip will be applied thereto. If the operator then actuates the switch 58, the apparatus 16 will be placed in the so-called bypass operating mode 302 wherein the indicator 59b will be illuminated in a flashing mode and a single document placed in slot 36 will be transported through the apparatus without application of a correction strip thereto. After the single document is transported through the apparatus 16 without a correction strip added thereto, the apparatus will automatically reset itself to mode 300.

If the operator desires to activate the feed mechanism for the slot 38, the switch 58 may be actuated twice, if the apparatus is initially in mode 300, to place the apparatus in the mode indicated by numeral 304 in FIG. 13. In this operating mode, the indicator 59d will flash and a single check placed in "destrip" slot 38 will have an old correction strip removed therefrom and a new correction strip applied thereto. After a single check passes through the transport path from slot 38, when operating in mode 304, the apparatus will automatically reset back to mode 300. If the operator inadvertently places the apparatus 16 in operating mode 304, actuation of the switch 58 will return the apparatus to mode 300 without placing a check in the feed slot 38.

As shown in FIG. 13, the operator may also select an operating mode indicated by numeral 306. In this operating condition, any document placed in slot 38 will automatically have a correction strip removed therefrom and pass through the apparatus without a new correction strip added thereto. Moreover, a document placed in slot 36 will also be passed through the apparatus without the addition of a new correction strip. Lastly, if the operator selects operating mode 309 as the primary operating mode, indicators 59b, 59c and 59d will be illuminated and a document placed in slot 38 will have a correction strip removed therefrom and a new correction strip applied thereto as it is processed through the apparatus. However, a document placed in slot 36 will be passed through the apparatus without the addition of a correction strip thereto. If the apparatus 16 is operating in mode 309, and it is desired to process a document which does not have a correction strip thereon but for which it is desired to add a correction strip thereto, the switch 58 may be actuated to place the apparatus temporarily in mode 300 so that a document placed in slot 36 will pass through the apparatus and have a correction strip applied thereto. When a document has been passed through slot 36, after the apparatus has been temporarily taken out of mode 309 as described above, the apparatus may be automatically reset to mode 309. If the apparatus 16 is inadvertently placed in operating mode 300 by actuation of the switch 58 and it is not desired to have a correction strip applied to a check (which does not have an "old" correction strip thereon), the switch 58 may be actuated to place the apparatus back in operating mode 309, as indicated by the flow diagram of FIG. 13. The apparatus may be returned to operating mode 300 by actuation of the switch 40d.

Operation of the apparatus 16 in the aforementioned modes will now be described. The apparatus 16, when placed in an operating condition, is operable to energize the motor 64 to continuously drive the belt 68, the drum 72 and the belt 74. Continuous traversal of the belt 74 about its closed loop path effects driving of the belts 96, 106, 116, 172, 180 and 182. Separate drive motors may be operated to drive the respective endless belts 62, also on a substantially continuous or intermittent basis so that when documents are placed in either slots 36 or 38 they are immediately fed in registration with the respective edges 37 or 39 along the parallel transport paths previously described. Moreover, when the stacking mechanism 44 senses the presence of a document in the slot 47, it is operated by a separate drive motor to stack the document in the stack 130 in the manner previously described and as also described in U.S. Pat. No. 5,135,115. When the apparatus 16 is in a ready state, the motor 204 is operated periodically to assure that continuous strip material 194 is disposed in the plenum space 200 to provide sufficient slack accommodate operation of the motor 208. The motor 208 is controlled by the controller 252 in a manner to be described herein.

Figure 11:
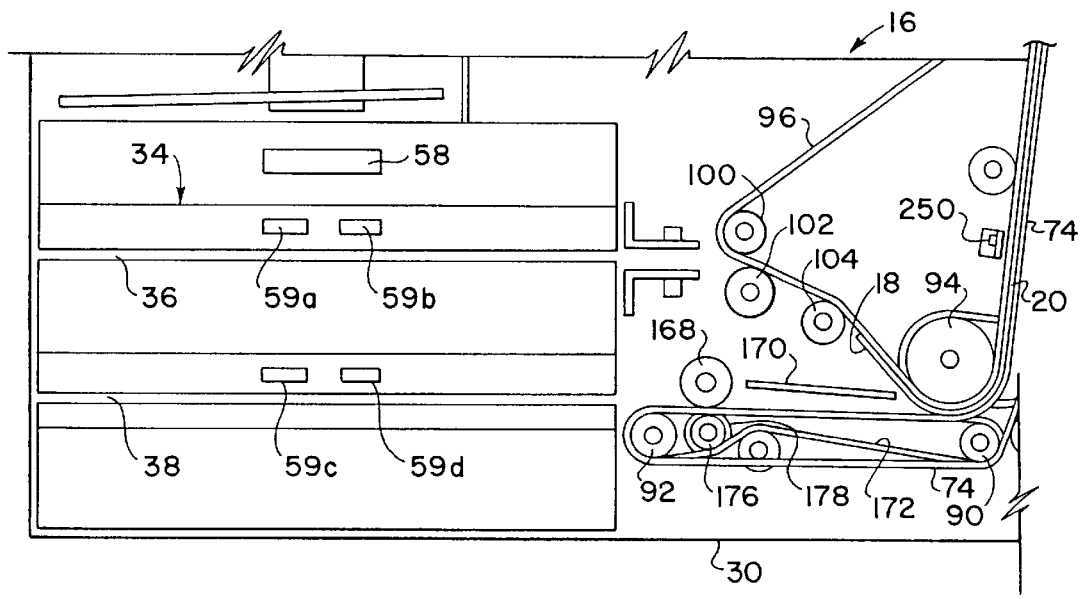
FIG. 11 is a detail plan view showing the initial feedpath portion for a check document which is to have a correction strip applied thereto.

With the apparatus 16 in the strip application mode 300, placement of a check in the slot 36 will effect feeding of the check toward the belt 96 and between the belt 96 and the rollers 102 and 104. FIG. 11 illustrates a document 18 disposed along this initial parallel path portion and also in the common transport path, which begins at the roller 94. As the leading edge 20 of a check document 18 reaches the sensor 250, which detects the presence of a check document, the motor 208 is energized to feed correction strip material of a predetermined length from the cutoff point provided by the knife 224 to a point in proximity to the sensor 254. The motor 208 may be a stepping motor so that precise control over the movement of the strip material 194 is provided. The sensor 250 also measures the length of the check document 18, for example, as it traverses along the transport path between the belts 96 and 74 and between the belts 106 and 74. This length signal is provided to the controller 252 for control of the operation of the motor 208 to feed out a predetermined amount of strip material 194 to be of the same length as the check document. As a check 18 or 22 passes into engagement with the rollers 110, the longitudinal bottom edge is brought in registration with the reference surface 112 to align the document for movement onto the drum 72. As a leading edge, such as the edge 20 of a check 18, is transported into position to be sensed by the sensor 254, and with the information stored in the controller 252 concerning the length of the check, the motor 208 is actuated to begin feeding correction strip material in synchronization with the movement of the check past the sensor 254 so that the leading edges of both the check and the correction strip are aligned with each other.

After the correction strip material 194 is biased by roller 222 into engagement with flange 74 at the drum 72, the linear feeding speed of the motor 208 is increased to be slightly greater than the linear feeding speed of the belt 74 so that a slight bowing action occurs in the correction strip material between the guideplates 221 and 223 to minimize any tugging action on the correction strip material as it is severed by the knife 224. When the requisite length of correction strip material has been fed past the knife 224 a signal is initiated by the controller 252 to the solenoid actuator 225 to effect cutting of the correction strip at its trailing end. Movement of the knife 224 is momentary to effect cutting of the correction strip whereupon the knife returns to the position illustrated in FIG. 8 to clear the transport path for the continuous length of strip material 194.

As the leading edges of the check and the correction strip move in concert along the surface of the drum 72 the skewing roller 222 maintains the correction strip in engagement with the flange 75 to assure that the correction strip will be properly aligned with the check. The belt 74 then traverses the check document and the correction strip along the transport path and pressed against the drum surfaces 73 and 73a, respectively, until the adhesive band portion 134 engages the heater element 146 and its protective wear strip 148 whereupon heat is applied to the adhesive band portion and the correction strip is secured to the longitudinal bottom portion of the front face of the check document. As the check passes out of registration with the heater element 146 and wear strip 148 and along the transport path provided by the belt 74 and the belt 116, the sensor 256 determines whether or not a correction strip has been applied to the bottom of the check. The check document then proceeds along the transport path until it is registered in the slot 47 and the disk 46 is rotated in cooperation with the belt 50 to swing the document around and into the stack 130. Accordingly, the apparatus 16 operates to efficiently and rapidly traverse a check along the transport path aforedescribed whereupon a correction strip is rapidly and effectively applied to the check. Suitable printing of indicia may be carried out as the check and its attached correction strip pass through the printing station 80, of course.

As previously mentioned, an important feature of the present invention resides in the provision of the switch or bump bar 58 which enables an operator to change the mode of operation of the apparatus 16, at will. Accordingly, if a check document is in a stack being fed to the apparatus 16 and which does not require the addition of a correction strip, such as a carrier envelope having a strip area already affixed thereto, the operator may, before loading that check document into the slot 36, for example, actuate the switch 58 to change the mode of operation from one of adding a strip to the check document to a mode wherein the correction strip is not fed into position for matching up with the check document as it progresses around the drum 72. Accordingly, if the operator is desirous of changing the mode of operation from the strip application mode 300 to the so-called bypass mode 302 wherein a correction strip is not applied to the check document, the switch 58 is actuated. Once that check has been fed from the slot 36 through the opening 42 and into the transport path, the apparatus 16 automatically resumes operation in the correction strip application mode.

If the operator desires to insert a check in the apparatus 16 for removal of a correction strip and application of a new correction strip then the next check document in the stack from which the operator is working is inserted in slot 38 after the switch 58 is actuated twice to go from the strip application mode 300 to the bypass mode 302 to the restrip mode 304.

Figure 12:
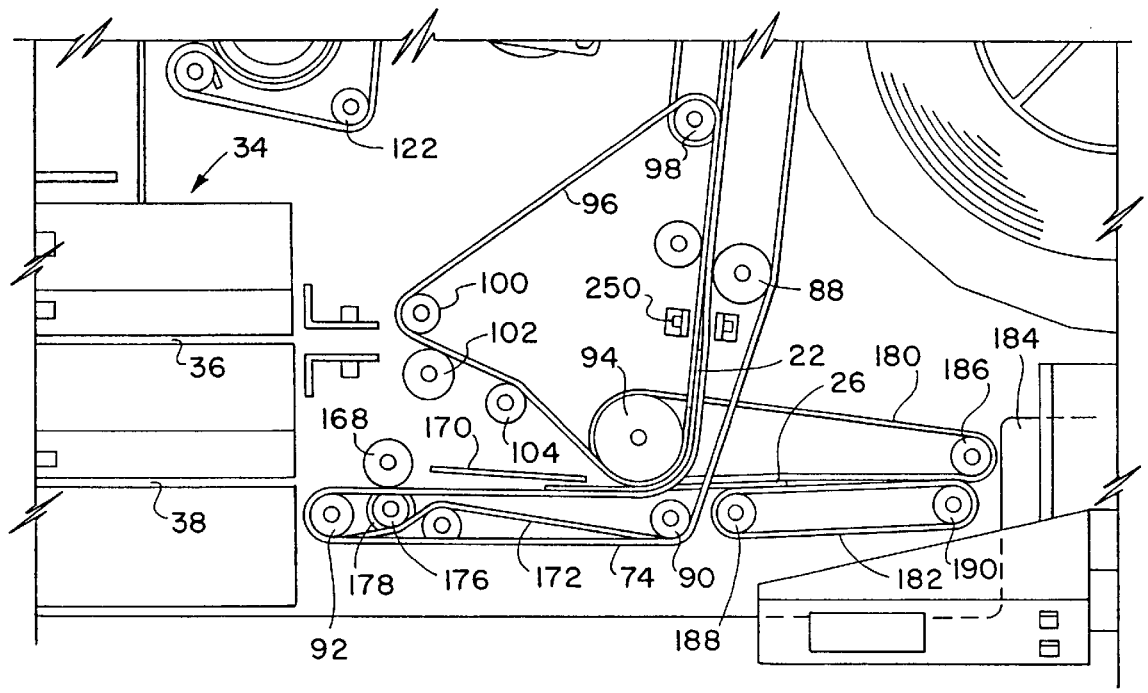
FIG. 12 is a detail plan view showing the initial feedpath portion for transporting a check to have a correction strip removed therefrom.

When a check document is inserted in the slot 38 with its associated feedbelt 62 operating, the biasing rollers 60 associated with slot 38 will bias the check document down into registration of its correction strip 26, for example, with the slot bottom edge 39 to properly orient the check document for movement through its transport path. The feed station 34 is also provided with a set of sensors 240 and 244 associated with the slot 38 to assure that a check to be destripped and restripped is properly oriented in the slot 38. Referring to FIG. 12 also, as a check 22 leaves the slot 38 and is engaged by the belt 74 and the roller 168, a lower portion of the check is also engaged by the belt 172 to firmly hold the check against the roller 168 and wherein the knife 178 cuts the strip 26 from the bottom edge of the check 22, as shown also in FIG. 9. FIG. 12 shows the check 22 in a position where it has passed between the belts 74 and 172 and the roller 168 to cut the correction strip 26 from the check, which correction strip is then captured between belts 180 and 182, as illustrated, and traversed toward the receptacle 184. The check 22 then traverses the common transport path toward the drum 72 in the same manner as a check which has not required destripping.

If a check is to be destripped and not restripped, the bypass mode 302 is active for a document placed in feed slot 36 and mode 306 is active when a check or other document is placed in the slot 38. The check thus progresses through the aforementioned preliminary parallel feedpath toward engagement by the belts 74 and 96 at the roller 94 and, once a strip 26, for example, has been removed from the check it may progress through the transport path to the stacker mechanism 44 without application of a new correction strip thereto.

Accordingly, the apparatus 16 may be operated in three primary modes, one wherein all check documents fed into the apparatus from slot 36 have a new correction strip applied thereto. This primary operating mode may be momentarily changed to a bypass mode or a destrip and restrip mode as indicated in FIG. 13. Secondly, the apparatus 16 may be placed in a primary operating mode 306 wherein all documents placed in slot 38 are fed through the initial portion of a transport path which removes previously applied correction strips from the documents and no new strips are applied thereto. Moreover, an alternate mode 302 is provided wherein a check which does not have an old correction strip thereon may be passed through the apparatus 16 without application of a correction strip if such a check is fed from slot 36. Lastly, the apparatus 16 may be placed in primary operating mode 309 wherein checks fed to the apparatus from slot 38 have a previously applied correction strip cut therefrom and a new correction strip applied thereto. Again, if a check document is desired to be fed through the apparatus 16 to maintain a predetermined sequence of checks in a stack, without application of a new correction strip it may be fed to the apparatus through slot 36. Moreover, if the apparatus is operating in mode 309, it may be temporarily placed in mode 300 for one check document if such document is fed through the apparatus by way of slot 36. Again, if the operator does not wish to keep the slot 36 in mode 300 actuation of the switch 58 will return the apparatus to the mode 309 operating state.

Figure 14:
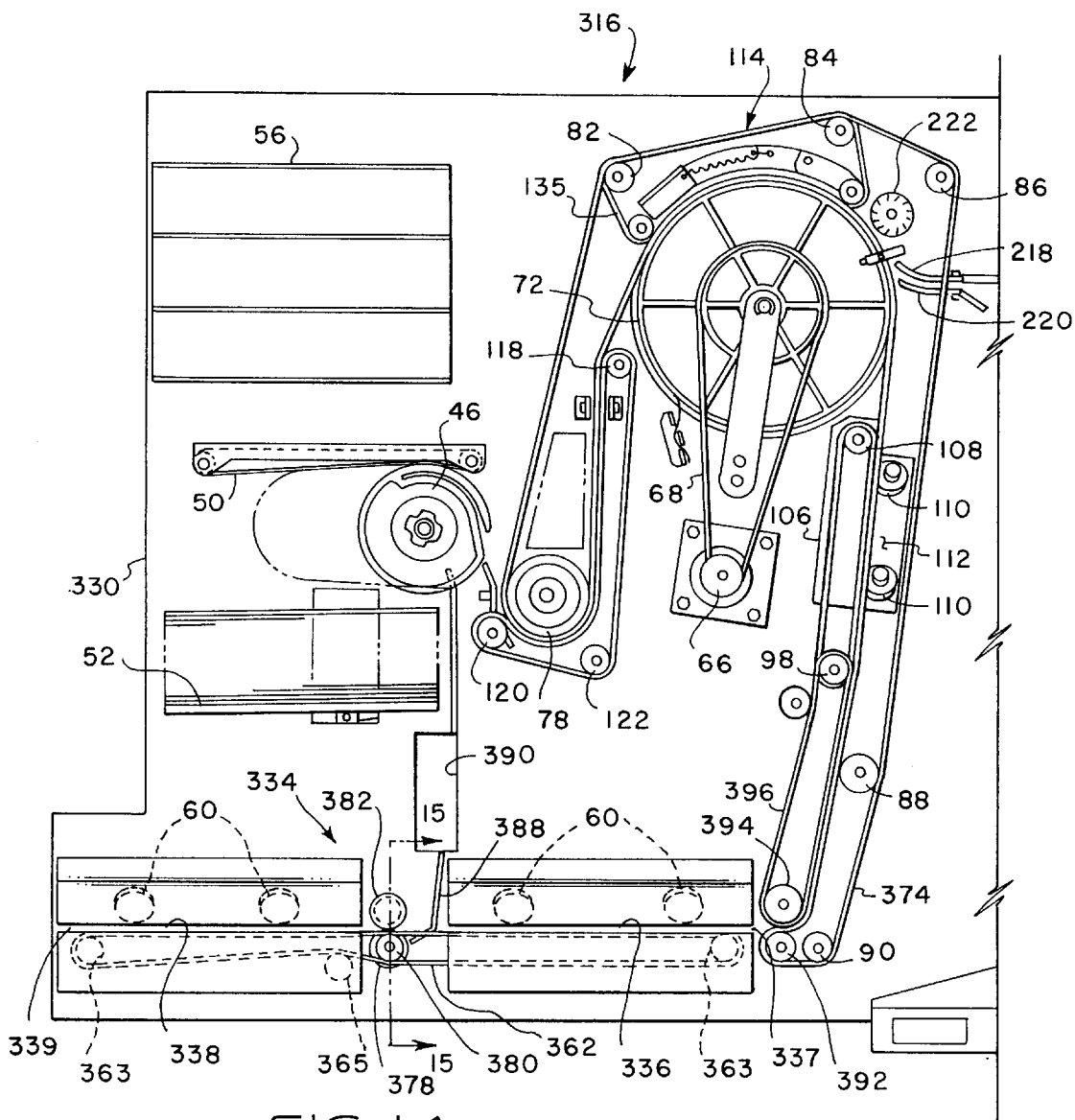
FIG. 14 is a plan view of an alternate embodiment of an apparatus in accordance with the present invention.
Figure 15:
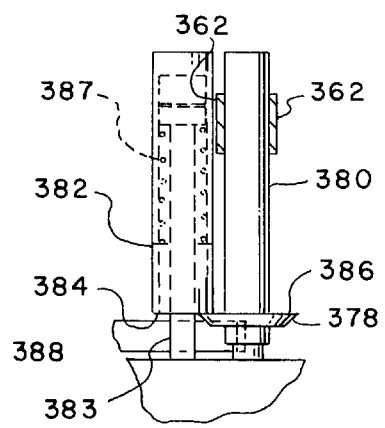
FIG. 15 is a detail view taken generally from the line 15—15 of FIG. 14.

Referring now to FIGS. 14 and 15, there is illustrated another embodiment of a strip attachment and removal apparatus in accordance with the invention and generally designated by the numeral 316. The apparatus 316 includes a frame 330 and a serial feed station 334 disposed thereon and forming part of a continuous transport path through the apparatus for attaching a new correction strip to a check document, removing an old correction strip from a check document, removing an old correction strip from a check document and attaching a new correction strip and processing a check document through the apparatus 316 without removal of an old correction strip or application of a new correction strip. The feed station 334 includes a first transport path portion comprising a check document feed slot 336 which is arranged substantially in line with feed mechanism defining a second transport path portion comprising a check document feed slot 338.

Spaced apart and canted rollers 60 are associated with each of the slots 336 and 338 for biasing respective check documents toward a reference edge 337 and 339, respectively. A flexible endless feed belt 362 is trained over spaced apart rollers 363 and a biasing roller 365. One of the rollers 363 is suitably connected to a drive motor, not shown. The belt 362 is operable to engage a check document placed in either the slot 336 or 338 for feeding the document along a continuous transport path which includes a rotating knife 378, see FIG. 15 also, which is drivenly connected to a roller 380 engaged with the belt 362. The roller 380 is suitably supported on the frame 330 for rotation by the motor driven belt 362. A cooperating roller 382 has a lower transverse face 384, FIG. 15, which is cooperable with an opposed transverse face 386 on the knife 378 to provide a scissors-like cutting action for cutting an old correction strip from the bottom edge of a check document. The roller 382 is supported for rotation about a stationary support shaft 383 and is biased toward the face 386 by suitable spring means 387, FIG. 15. A correction strip deflecting finger or plate 388 is disposed between the feed slots 336 and 338 and "downstream" of the knife 378 in the direction of movement of a check document through the apparatus 316 for deflecting a correction strip cut from a check document into a receptacle 390, FIG. 14.

Referring further to FIG. 14, the apparatus 316 includes a continuous transport path for receiving check documents fed from the slots 336 or 338 to an endless flexible transport belt 374 which is trained over rollers 88, 90 and 392 and around the drum 72 in the same manner as the arrangement of the apparatus 16. An endless flexible guide belt 396 is engageable with the belt 374 and is trained over rollers 98 and 394. The belt 396 is cooperable with the belt 374 to transport a check document along the continuous feed path for registration with a guide surface 112 as it approaches the drum 72. After a document leaves engagement with belt 396, it then passes between belts 374 and 106 and is biased by rollers 110 toward the aforementioned surface 112.

The apparatus 316 may be operated in a manner substantially similar to the operation of the apparatus 16. For example, if it is desired to process a check document through the apparatus 316 without removal of a correction strip therefrom, the document is placed in the slot 336 and is fed toward the drum 72 between the belts 374 and 396 after the document leaves the slot. Such a document may then either be bypassed through the apparatus 316 without application of a correction strip thereto or have a correction strip applied thereto at the drum 72.

If it is desired to process a check document through the apparatus 316 to remove a correction strip therefrom, then such a document is placed in the slot 338 and transported along a continuous transport path which includes the correction strip removal knife 378 and the cooperating roller 382. A check document passing between the rollers 380 and 382 enters the slot 336 without an old correction strip attached thereto and is fed on toward the transport belt 374 by the belt 362 and the cooperating biasing rollers 60 in slot 336. Any misalignment of the check document which may have occurred as an old correction strip is cut therefrom is corrected as the canted rollers 60 associated with a slot 336 bias the bottom longitudinal edge of the check document in registration with the slot edge 337 before the check document enters the portion of the continuous transport path defined by the belt 374. Although the embodiments illustrated and described above contemplate the provision of a unique correction strip removal mechanism those skilled in the art will recognize that a thermal type strip removal mechanism, such as described in U.S. Pat. No. 4,966,644, may be utilized in conjunction with the above-described apparatus in place of the mechanism which mechanically cuts the old correction strip from the check document.

The construction and operation of both the apparatus 16 and 316 is believed to be within the purview of one of ordinary skill in the art from the foregoing description. The apparatus 16 and 316 may be constructed of conventional elements and materials used for document processing machinery and the motors, rollers, belts and related components may be generally of conventional design for such machinery. Although preferred embodiments of the apparatus, as well as methods of operation, have been described in detail herein, those skilled in the art will recognize that various substitutions and modifications may be made without departing from the scope and spirit of the appended claims.

What is claimed is:

1. Apparatus for selectively applying a strip of material to a document for carrying encodable indicia on said strip and for removing an old correction strip of encoded indicia from such a document, characterized by:

means forming a first transport path portion for transporting a first document for application of a new correction strip thereto;

means forming a second transport path portion for receiving a second document having an old correction strip applied thereto and which is to be removed from said second document;

means for removing said old correction strip from said second document;

means forming a common transport path for said first document and said second document and aligned with said first transport path portion and said second transport path portion for receiving said first document and said second document for transport through said apparatus; and means disposed along said common transport path and operable to selectively apply a new correction strip to at least one of said documents.

2. The apparatus set forth in claim 1 including:

document feed mechanism associated with said first transport path portion and said second transport path portion, respectively, for feeding documents toward said common transport path.

3. The apparatus set forth in claim 2 wherein:

said feed mechanisms each include a reference surface for registration with a longitudinal side edge of said documents, respectively, for aligning said documents for movement through said common transport path.

4. The apparatus set forth in claim 3 wherein:

at least one of said feed mechanisms comprises an endless feed belt trained over spaced apart drive rollers, at least one of said drive rollers being mounted for rotation about an axis eccentric to a belt engaging surface of said one drive roller, and said at least one feed mechanism includes at least one biasing roller disposed adjacent to said belt and cooperable with said belt during rotation of said one drive roller to impart a driving force on said document along said transport path portion associated with said at least one feed mechanism and toward engagement of a longitudinal side edge of said one document with said reference surface.

5. The apparatus set forth in claim 3 including:

sensor means associated with said at least one feed mechanism for sensing at least one of a damaged leading edge of said documents and registration of said side edge of said documents with said reference edge.

6. The apparatus set forth in claim 1 including:

a rotatable drum interposed in said common transport path for receiving a document in registration with said drum for application of a new correction strip to said document; and heater means disposed in proximity to said drum and engageable with an adhesive band connected to said new correction strip for effecting connection of said new correction strip by said adhesive band to a front lower face of said document.

7. The apparatus set forth in claim 6 including:

a correction strip alignment flange formed on said drum and engageable with an edge of a new correction strip to be applied to said document.

8. The apparatus set forth in claim 7 including:

a biasing roller disposed in proximity to said drum and engageable with a new correction strip for urging said new correction strip into engagement with said flange.

9. The apparatus set forth in claim 6 including:

means forming an alignment surface for said documents interposed in said common transport path for aligning an edge of said documents with respect to said drum prior to engagement of said documents with said drum; and at least one biasing roller engageable with a document as it passes along said common transport path for biasing said document toward said alignment surface.

10. The apparatus set forth in claim 6 including:

means associated with said apparatus for supplying a continuous length of correction strip for transport toward said drum;

a feed motor engageable with said continuous length of correction strip for feeding a predetermined length of correction strip toward said drum; and cutter means interposed between said feed motor and said drum for cutting a new correction strip to a predetermined length for application to a document transported to said drum.

11. The apparatus set forth in claim 1 wherein:

said common transport path is defined at least in part by a flexible belt trained over spaced apart rollers, said belt defining at least part of one of said first and second transport path portions for receiving a document fed from said feed mechanism associated with said one transport path portion.

12. The apparatus set forth in claim 11 including:

a cutter disposed on said apparatus for cutting an old correction strip from a document along said second transport path portion.

13. The apparatus set forth in claim 12 wherein:

said cutter is rotatably driven by said belt.

14. The apparatus set forth in claim 1 including:

a rotatable drum defining a part of said common transport path and drivingly engaged with a first flexible belt trained over spaced apart rollers and defining part of said common transport path; and a second belt drivingly engaged with said first belt and defining at least part of one of said first and second transport path portions.

15. The apparatus set forth in claim 14 wherein:

said first belt defines at least part of one of said first and second transport path portions.

16. The apparatus set forth in claim 14 including:

a third belt drivenly connected to said first belt and forming a transport path portion for transporting an old correction strip removed from a document disposed in said apparatus.

17. The apparatus set forth in claim 14 including:

said drum includes a surface engageable with said document and means for aligning an edge of a new correction strip with said document when said document is engaged with said drum for attaching said new correction strip to said document.

18. The apparatus set forth in claim 17 including:

a heater element disposed in proximity to said drum and engageable with an adhesive band portion of said new correction strip for adhesively attaching said new correction strip along a lower front edge of said document.

19. The apparatus set forth in claim 18 wherein:

said heater element comprises a flexible band member interposed between spaced apart supports disposed in proximity to said drum and a removable wear strip engaged with said heater element and interposed between said heater element and a new correction strip being applied to said document to minimize contact between said new correction strip and said heater element to reduce wear on said heater element.

20. The apparatus set forth in claim 14 including:

a document stacking mechanism disposed at one end of said common transport path for receiving documents seriatim and for placing said documents in a stack in a predetermined sequence.

21. The apparatus set forth in claim 1 including:

operator actuated switch means disposed on said apparatus and operable to be actuated to selectively control said apparatus to provide for transport of a document through said apparatus for application of a new correction strip thereto and for transport of said document through said apparatus without application of a new correction strip thereto.

22. Apparatus for selectively applying a new correction strip to a document, and for removing an old correction strip from such a document, characterized by:

a document transport structure forming a continuous transport path for said documents and engageable with a document continuously during movement of said document through said transport path to selectively apply a new correction strip to one of said documents and remove an old correction strip from one of said documents;

means disposed along said transport path for removing an old correction strip from a document; and means disposed along said transport path in a position downstream of said means for removing an old correction strip from a document, with respect to the direction of movement of said document along said transport path, for receiving a document for application of a new correction strip to said document.

23. The apparatus set forth in claim 22 wherein:

said means disposed along said transport path for application of a new correction strip includes a rotatable drum for receiving a document in registration therewith for application of a new correction strip to said document; and heater means disposed in proximity to said drum and engageable with an adhesive band connected to said new correction strip for effecting connection of said new correction strip to said document.

24. The apparatus set forth in claim 23 including:

means forming an alignment surface for said documents disposed in said transport path for aligning an edge of said documents with respect to said drum prior to engagement of said documents with said drum; and means engageable with a document as it passes along said transport path for biasing said document toward said alignment surface.

25. The apparatus set forth in claim 22 wherein:

said transport path is defined at least in part by a flexible endless belt trained over spaced apart rollers.

26. The apparatus set forth in claim 25 including:

a cutter disposed adjacent to said belt for cutting an old correction strip from a document as said document passes along said transport path.

27. The apparatus set forth in claim 26 wherein:

said cutter is rotatably driven by said belt.

28. The apparatus set forth in claim 25 including:

a document alignment surface disposed adjacent to said belt and at least one roller mounted for rotation in a plane forming an acute angle with respect to said surface, said roller being rotatably driven by said belt and engageable with a check document traversing said transport path for biasing said check document toward engagement with said alignment surface.

29. A method for processing documents in a predetermined sequence to apply a new correction strip to a check, comprising the steps of:

providing apparatus including means for applying a new correction strip to a bottom longitudinal edge of a check, said apparatus including means for supplying a correction strip to said means for applying said correction strip, means forming a common transport path for transporting checks to said means for applying a correction strip thereto, means forming a first transport path portion in communication with said common transport path for feeding checks to said common transport path, means forming a second transport path portion for transporting checks to said common transport path and means for removing an old correction strip from a check transported along said second transport path portion;

selectively feeding a check to one of said first and second transport path portions and causing said apparatus to supply a new correction strip to said means for applying a new correction strip and apply said new correction strip to said check when said check reaches said means for applying a new correction strip thereto.

30. The method set forth in claim 29 including the step of:

feeding a check having an old correction strip applied thereto along said second transport path portion to remove said old correction strip from said check; and causing said apparatus to apply a new correction strip to said check which has had an old correction strip removed therefrom.

31. The method set forth in claim 30 including the step of:

causing a check which has had an old correction strip removed therefrom to be transported through said apparatus without applying a new correction strip to said check.

32. The method set forth in claim 29 including the step of:

causing said apparatus to transport a check through said means for applying a new correction strip thereto without applying a new correction strip to said check.

33. Apparatus for selectively applying a new correction strip to a document, and for removing an old correction strip from such a document, characterized by:

means forming a continuous transport path for said documents for transport through said apparatus to selectively apply a new correction strip to one of said documents and remove an old correction strip from one of said documents;

means disposed along said transport path for removing an old correction strip from a document; and means disposed along said transport path for receiving a document for application of a new correction strip to said document including a rotatable drum for receiving a document in registration therewith for application of a new correction strip to said document, an alignment flange formed on said drum and engageable with an edge of said new correction strip for aligning said new correction strip with said document, and heater means disposed in proximity to said drum and engageable with an adhesive band connected to said new correction strip for effecting connection of said new correction strip to said document.

34. Apparatus for selectively applying a new correction strip to a document and for removing an old correction strip from such a document, characterized by:

means forming a continuous transport path for said documents for transport through said apparatus to selectively apply a new correction strip to one of said documents and remove an old correction strip from one of said documents;

means disposed along said transport path for removing an old correction strip from a document;

means disposed along said transport path for receiving a document for application of a new correction strip to said document; and a feed station for feeding documents to said transport path, said feed station including means forming a first feed slot for receiving a check document without an old correction strip applied thereto and means forming a second feed slot for receiving a check document having a correction strip applied thereto.

35. The apparatus set forth in claim 34 wherein:

said feed slots are arranged in side-by-side relationship and said apparatus includes means for transporting a check document from each of said feed slots to a portion of said transport path for receiving said check documents from either of said feed slots.

36. The apparatus set forth in claim 34 wherein:

said feed station includes spaced apart feed slots for receiving a check document without a correction strip applied thereto and for receiving a check document with a correction strip applied thereto, respectively, said feed slots being arranged seriatim along said transport path.

37. The apparatus set forth in claim 36 wherein:

said means for removing an old correction strip from a document is interposed between said feed slots.

* * * * *